(12) United States Patent
Chabanne et al.

(10) Patent No.: US 9,286,454 B2
(45) Date of Patent: Mar. 15, 2016

(54) METHOD OF IDENTIFYING A USER BY MEANS OF MODIFIED BIOMETRIC CHARACTERISTICS, AND A DATABASE FOR IMPLEMENTING THE METHOD

(75) Inventors: Hervé Chabanne, Mantes-la-Jolie (FR); François Rieul, Saint-Germain en Laye (FR); Bernard Didier, Vulaines sur Seine (FR)

(73) Assignee: MORPHO, Paris (FR)

( * ) Notice: Subject to any disclaimer, the term of this patent is extended or adjusted under 35 U.S.C. 154(b) by 1585 days.

(21) Appl. No.: 11/791,694

(22) PCT Filed: Nov. 2, 2005

(86) PCT No.: PCT/FR2005/002894
§ 371 (c)(1),
(2), (4) Date: May 12, 2008

(87) PCT Pub. No.: WO2006/056683
PCT Pub. Date: Jun. 1, 2006

(65) Prior Publication Data
US 2009/0106559 A1    Apr. 23, 2009

(30) Foreign Application Priority Data
Nov. 29, 2004   (FR) ..................................... 04 12618

(51) Int. Cl.
*G06F 21/32* (2013.01)
*G06F 21/31* (2013.01)
(Continued)

(52) U.S. Cl.
CPC ................ *G06F 21/32* (2013.01); *G06F 21/31* (2013.01); *G06K 9/00087* (2013.01);
(Continued)

(58) Field of Classification Search
CPC ............ G06F 21/31; G06F 21/32; H04L 9/06; H04L 9/32; H04L 9/3231; H04L 63/083
USPC ........................................................ 713/186
See application file for complete search history.

(56) References Cited

U.S. PATENT DOCUMENTS

| 4,972,476 A | 11/1990 | Nathans et al. |
| 5,790,668 A * | 8/1998 | Tomko ........................... 713/186 |

(Continued)

OTHER PUBLICATIONS

Jain, Anil K., and Umut Uludag. "Hiding biometric data." Pattern Analysis and Machine Intelligence, IEEE Transactions on 25.11 (2003): pp. 1494-1498.*

(Continued)

*Primary Examiner* — Kari Schmidt
(74) *Attorney, Agent, or Firm* — Muncy, Geissler, Olds & Lowe PC

(57) ABSTRACT

The present invention relates to a method of identifying a user, the method being implemented by means of a database containing personal data of users and containing for each user at least one unmodified biometric characteristic (E1,$i$), at least one biometric characteristic (E2,$i$) that has been modified and that is accessible from the unmodified biometric characteristic, and at least one item of identification data (D) that is accessible from a code identifying the modification that has implemented on the second biometric characteristic. The method comprises the steps of comparing first and second biometric characteristics (e1,$i$) read from the user with the characteristics in the database in order to determine (5) what modification has been implemented and to deduce therefrom the code identifying the modification; and extracting (6) the identification data by means of the code as deduced in this way. The invention also provides a database for implementing the method.

4 Claims, 1 Drawing Sheet

(51) Int. Cl.
*H04L 9/32* (2006.01)
*H04L 9/06* (2006.01)
*H04L 29/06* (2006.01)
*G06K 9/00* (2006.01)
*G07C 9/00* (2006.01)

(52) U.S. Cl.
CPC ....... *G06K 9/00885* (2013.01); *G07C 9/00158* (2013.01); *H04L 9/06* (2013.01); *H04L 9/32* (2013.01); *H04L 9/3231* (2013.01); *H04L 63/083* (2013.01)

(56) References Cited

U.S. PATENT DOCUMENTS

| | | | | |
|---|---|---|---|---|
| 5,991,408 | A * | 11/1999 | Pearson et al. | 713/186 |
| 6,317,834 | B1 * | 11/2001 | Gennaro et al. | 713/186 |
| 6,735,695 | B1 * | 5/2004 | Gopalakrishnan et al. | 713/186 |
| 7,269,737 | B2 * | 9/2007 | Robinson | G06Q 20/04 340/5.82 |
| 7,278,028 | B1 * | 10/2007 | Hingoranee | 713/186 |
| 7,690,032 | B1 * | 3/2010 | Peirce | 726/9 |
| 7,693,279 | B2 * | 4/2010 | Chen et al. | 380/44 |
| 7,761,715 | B1 * | 7/2010 | Califano et al. | 713/186 |
| 2003/0120934 | A1 * | 6/2003 | Ortiz | 713/186 |
| 2003/0156011 | A1 | 8/2003 | Modl et al. | |
| 2003/0163710 | A1 * | 8/2003 | Ortiz et al. | 713/186 |
| 2005/0210269 | A1 * | 9/2005 | Tiberg | 713/186 |

OTHER PUBLICATIONS

Yang, Shenglin, and Ingrid M. Verbauwhede. "Secure fuzzy vault based fingerprint verification system." Signals, Systems and Computers, 2004. Conference Record of the Thirty-Eighth Asilomar Conference on. vol. 1. IEEE, 2004. pp. 577-581.*

Yang, Shenglin, and Ingrid M. Verbauwhede. "A secure fingerprint matching technique." Proceedings of the 2003 ACM SIGMM workshop on Biometrics methods and applications. ACM, 2003. pp. 89-94.*

* cited by examiner

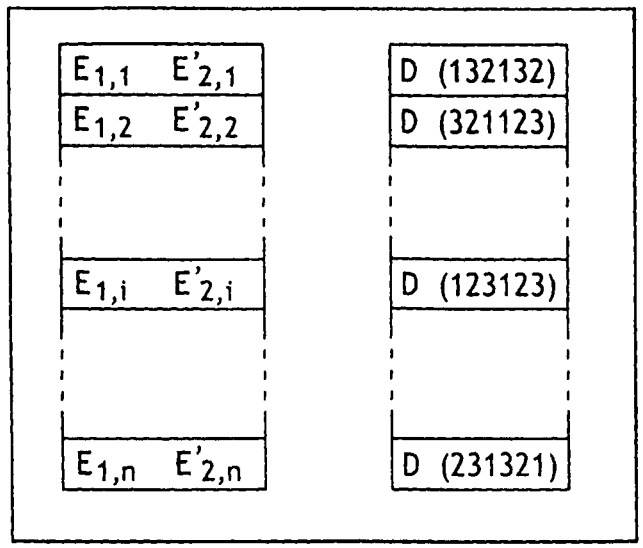
FIG.1
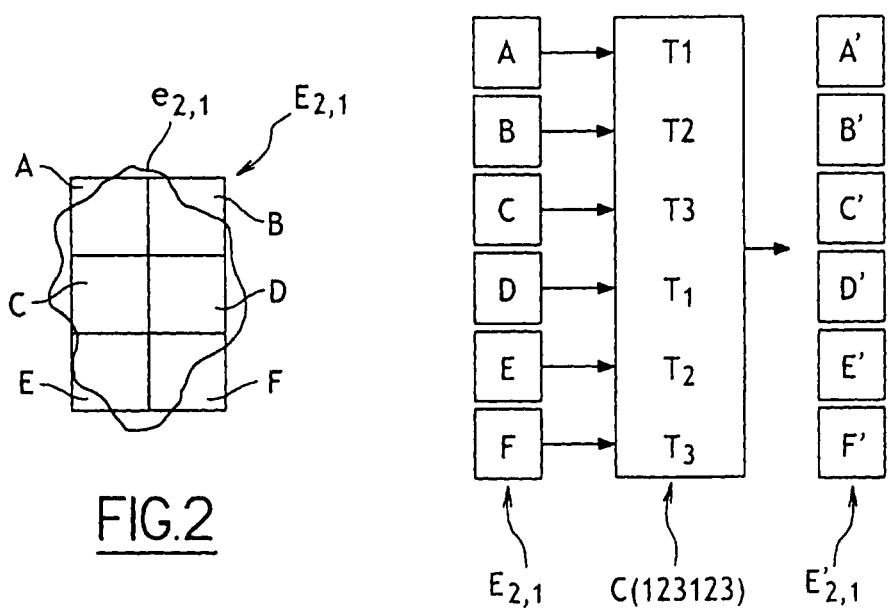
FIG.2
FIG.3
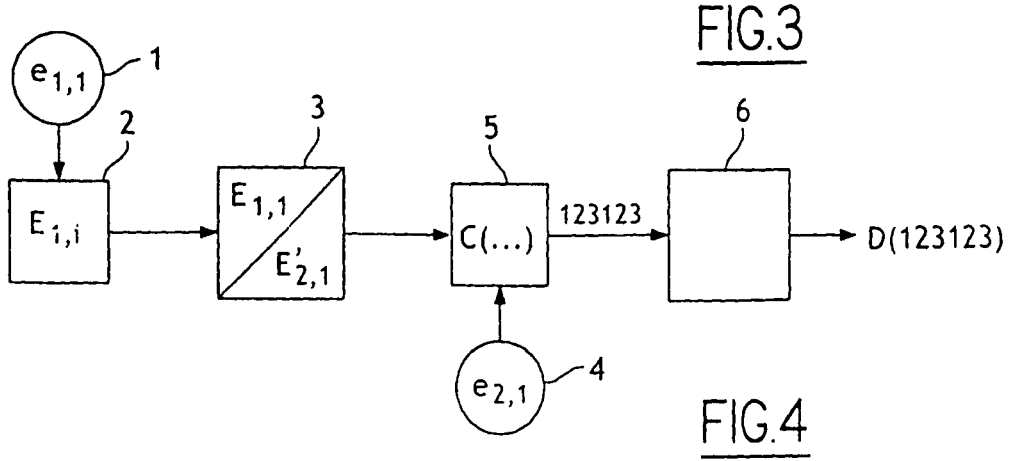
FIG.4

METHOD OF IDENTIFYING A USER BY MEANS OF MODIFIED BIOMETRIC CHARACTERISTICS, AND A DATABASE FOR IMPLEMENTING THE METHOD

FIELD OF THE INVENTION

The present invention relates to a method of identifying a user by means of a modified biometric characteristic, and to a database for implementing the method. The term "biometric characteristic" is used herein to mean a set of characteristic points, in particular of a fingerprint, of an iris, or of a face, that is specific to each individual and that enables said individual to be distinguished from other individuals.

By way of example, such a method can be used to verify the identity of a user or to authorize the user to access premises, or particular information, or a computer service.

BACKGROUND OF THE INVENTION

An identification method is known that is implemented by means of a database putting a biometric characteristic of each user into association with personal data of the user. A dishonest person having access to the database would then have access to all of the information needed for that user to usurp the identity of an authorized user. The correspondence between the biometric characteristic and the personal data also goes against the confidentiality that is normally associated with implementing a database suitable for identifying all of the users of a service or an application.

An authentication method is also known from document EP-A-1 126 419 that is implemented by means of a memory and that makes it possible to prevent a third party who gains access to that memory from being able to use the information it contains in order to falsify authentication. The memory contains a modified biometric characteristic obtained by implementing a combination of modifications on a fingerprint of the user, each modification being identified by a respective code, and where such modifications are constituted, for example, by geometrical transformations associated with the addition of decoys. The combination of these codes forms the authentication code. The method comprises the steps of reading the fingerprint from the user and applying thereto all possible modifications, with the resulting modified biometric characteristic then being compared after each modification or combination of modifications with the modified biometric characteristic that has been stored in memory. A match between stored and resulting modified biometric characteristics makes it possible to deduce the code for the combination of modifications that have been implemented, which code constitutes the authentication code. Thus, mere access to the memory does not give a dishonest user the ability to discover a user's fingerprint, nor the corresponding authentication.

Such a method is difficult to transpose to identifying users from a database containing the biometric characteristics and the personal data of a plurality of users. That would require implementing all possible modifications on the user's fingerprint and comparing the results obtained with each of the modified transformed biometric characteristics in the database. That would lead to an operation that is particularly lengthy and greedy for computer resources. Unless particularly large computer resources are available, the method is therefore increasingly less usable with a database as the number of users referenced in that database increases.

It would therefore be advantageous to have a method that avoids these drawbacks of the above-mentioned method.

OBJECTS AND SUMMARY OF THE INVENTION

To this end, the invention provides a method of identifying a user that is implemented by means of a database of the personal data of users, containing for each user at least one unmodified first biometric characteristic, at least one second biometric characteristic that is accessible from the unmodified first biometric characteristic and that has been modified by at least one modification, and at least one item of identification data that is accessible from a code identifying the modification that has been implemented on the second biometric characteristic. The method comprises the following steps:

reading from the user a first biometric characteristic and comparing it with the unmodified first biometric characteristics in the database in order to identify the unmodified first biometric characteristic that corresponds to the user;

reading from the user a second biometric characteristic and comparing it with the modified second biometric characteristic that is accessible from the unmodified first biometric characteristic of the user in order to determine what modification has been implemented and thus deduce the code identifying the modification; and extracting the identification data by means of the code as deduced in this way.

Thus, the first biometric characteristic makes it possible rapidly firstly to determine whether the user has a reference in the database, and secondly to find the modified second biometric characteristic that is stored in the database and that corresponds to the user. The second biometric characteristic read from the user then makes it possible to discover the modification that was implemented on the second biometric characteristic, and to deduce therefrom the code identifying said modification. On the basis of the code, it is then possible to access the personal data of the user. As a result, a third party having access to the database cannot establish a link between the biometric characteristics and the personal data of the users.

The invention also provides a database containing personal data of users for implementing the above method. The database contains, for each user, at least one unmodified first biometric characteristic, at least one second biometric characteristic that is accessible from the unmodified first biometric characteristic and that has been modified by means of at least one modification, and at least one item of identification data that is accessible from a code identifying the modification that has been performed on the second biometric characteristic.

Other characteristics and advantages of the invention appear on reading the following description of a particular and non-limiting implementation of the invention.

Reference is made to the accompanying drawing, in which:

BRIEF DESCRIPTION OF THE DRAWING

FIG. 1 is a diagrammatic view showing the organization of a database in accordance with the invention;

FIGS. 2 and 3 show steps in modifying biometric characteristics; and

FIG. 4 is a block diagram showing the identification method in accordance with the invention.

MORE DETAILED DESCRIPTION

With reference to the figures, the method of identification in accordance with the invention is implemented by means of a personal database of users, given overall reference 1, containing personal data for n users i.

For each user i, the database contains an unmodified first record $E_{1,i}$, a modified second record $E'_{2,i}$, and identification data D.

The unmodified first biometric characteristic $E_{1,i}$ groups together the characteristic points of a first fingerprint $e_{1,i}$ of the user i, such as for example the user's left thumb print.

The modified second biometric characteristic $E'_{2,i}$ is obtained from an unmodified second biometric characteristic $E_{2,i}$ (see FIG. 2). The unmodified second biometric characteristic $E_{2,i}$ groups together the characteristic points of a second fingerprint $e_{2,i}$ of the user i, such as the fingerprint of the user's left index finger. The unmodified second biometric characteristic $E_{2,i}$ is subdivided into subsets A, B, C, D, E, and F that are subjected to modification. In this example, these modifications are transformations T1, T2, T3 implemented in the manner described in document EP-A-1 126 419. The transformations are transformations of the geometrical type, translation, permutation, rotation, scaling, . . . . Each transformation T1, T2, or T3 is identified by a code, in this case respectively 1, 2, or 3.

Taking a user 1 as an example (see FIG. 3), the subset A is subjected to the transformation T1 to form the subset A', the subset B is subjected to the transformation T2 to form the subset B', the subset C is subjected to the transformation T3 to form the subset C', the subset D is subjected to the transformation T1 to form the subset D', the subset E is subjected to the transformation T2 to form the subset E', and the subset F is subjected to the transformation T3 to form the subset F'. The modified second biometric characteristic $E'_2$, is thus the result of a combination of the transformations T1, T2, T3, and it comprises the subsets A', B', C', D', E', and F'. The combination of the transformations used for obtaining the modified second biometric characteristic $E'_2$, thus has the code 1 2 3 1 2 3.

By way of example, for a user 2, the combination of modifications that is performed to obtain the modified second biometric characteristic $E'_{2,2}$ might have the code 2 3 1 2 3 1.

By way of example, the identification data D might comprise the name of the user, civil status, address, the authorizations or rights available to the user, . . . .

The database 1 is organized in such a manner that the modified second biometric characteristic $E'_{2,i}$ is accessible from the unmodified first biometric characteristic $E_{1,i}$. A reference to the field containing the modified second biometric characteristic $E'_{2,i}$ may be contained for example in the field containing the non-modified first biometric characteristic $E_{1,i}$.

The identification data D of each user i is accessible from the code identifying the combination of modifications performed on the modified second biometric characteristic $E'_{2,i}$ corresponding to the user i. The code identifying the combination of modifications in this example thus constitutes information for locating the corresponding identification data D in the database.

The identification method in accordance with the invention is described below in the context of identifying the user 1 (see FIG. 4).

The identification method begins with a step 1 of reading from the user a first fingerprint $e_{1,1}$ and of extracting therefrom the first biometric characteristic $E_{1,1}$. This reading step is performed in conventional manner using a fingerprint detector and a recognition device, both known in themselves.

During a step 2, the first biometric characteristic $E_{1,1}$ of the user is compared with the first characteristics $E_{1,i}$ to verify that the user 1 is indeed referenced in the database. When the stored first biometric characteristic $E_{1,1}$ is found, the stored modified second biometric characteristic $E'_{2,1}$ corresponding to the stored first biometric characteristic $E_{1,1}$ is also identified (step 3).

During a step 4, a second fingerprint $e_{2,1}$ is read from the user and the second biometric characteristic $E_{2,1}$ is extracted therefrom.

The possible modifications, in this example the geometrical transformations T1, T2, and T3, are then tried out systematically in all possible combinations on the second biometric characteristic $E_{2,1}$ and the result of these combinations is compared with the modified second biometric characteristic $E'_{2,1}$ as stored (step 5). When the result of a combination matches the stored second modified biometric characteristic $E'_{2,1}$, then the code 1 2 3 1 2 3 corresponding to the successful combination is deduced and is used to locate the identification data D(1 2 3 1 2 3) corresponding to the user 1 who is thus identified (step 6).

Naturally, the invention is not limited to the implementation described but covers any variant coming within the ambit of the invention as defined by the claims.

In particular, the invention is applicable to other biometric characteristics, and in particular to any set of characteristic points, in particular belonging to a fingerprint, to an iris, or to a face, that is specific to each individual and that enables that individual to be distinguished from other individuals.

It is also possible to provide a modification consisting in adding at least one decoy to the subsets A', B', C', D', E', and F'. In this example, the decoy is a false subset containing imaginary characteristic points. The modifications could consist solely in adding decoys, without performing the transformations on the initial subsets. The number of transformations may also be different from that described.

Although the subsets are shown as being contiguous, the subsets could overlap.

In a variant, the identification D could be stored in the database in encrypted form. The code identifying the combination of transformations then constitutes a key suitable for deciphering the identification data D: the code is used for deciphering the data or for deciphering an encrypted key for use in deciphering the data.

What is claimed is:

1. A method of identifying a user, comprising the steps of:
providing a storage memory containing a database of the personal data of users, containing for each user at least one unmodified first biometric characteristic, at least one second biometric characteristic that is accessible from the unmodified first biometric characteristic and that has been modified by at least one modification wherein the at least one modification is a geometrical transformation, and at least one item of identification data that is accessible from a code identifying the modification that has been implemented on the second biometric characteristic, reading from the user a first biometric characteristic and comparing it with the unmodified first biometric characteristics that are stored in the database to rapidly determine whether the user has a reference in the database, identifying the stored unmodified first biometric characteristic that corresponds to the user and determining that the user has the reference in the database, and further identifying the associated stored modified second biometric characteristic that corresponds to the user using the identified stored unmodified first biometric characteristic;

reading from the user a second biometric characteristic and comparing it with the modified second biometric characteristic to determine what modifications have been implemented between the second biometric characteristic and the modified second biometric characteristic;

determining the modifications that have been implemented between the second biometric characteristic and the modified second biometric characteristic, the modifications are tried out systematically in all possible combinations on the second biometric characteristic and a result of these combinations is compared with the modified second biometric characteristic to identify the result of a combination that matches the modified second biometric characteristic in order to identify a code corresponding to the successful combination that matches modified second biometric characteristic;

using the code to locate the at least one item of identification data corresponding to the user in the database; and extracting the at least one item of identification data to identify the user.

2. A method according to claim 1, wherein the modified second biometric characteristic has been subjected to the combination of modifications, and wherein the code to the at least one item of identification data is constituted by the combination of codes identifying said modifications.

3. A method according to claim 1, wherein a reference to the field containing the modified second biometric characteristic is contained in the field containing the unmodified first biometric characteristic to identify the modified second biometric characteristic using the first biometric characteristic.

4. A method according to claim 1, wherein the at least one item of identification data is encrypted and wherein the code constitutes a key suitable for decrypting the at least one item of identification data.

* * * * *